United States Patent
Kim

(10) Patent No.: US 8,815,441 B2
(45) Date of Patent: Aug. 26, 2014

(54) SECONDARY BATTERY

(75) Inventor: Dong-Woo Kim, Suwon-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 1172 days.

(21) Appl. No.: 12/285,227

(22) Filed: Sep. 30, 2008

(65) Prior Publication Data

US 2009/0087738 A1    Apr. 2, 2009

(30) Foreign Application Priority Data

Oct. 2, 2007  (KR) .................. 10-2007-0099239

(51) Int. Cl.
*H01M 2/04*  (2006.01)

(52) U.S. Cl.
USPC ........................ 429/185; 429/163; 429/177

(58) Field of Classification Search
USPC ............... 429/130, 178, 180, 185, 163, 177
See application file for complete search history.

(56) References Cited

U.S. PATENT DOCUMENTS

| 2006/0073382 | A1* | 4/2006 | Urano et al. ............. 429/161 |
| 2006/0115726 | A1 | 6/2006 | Jung et al. |
| 2006/0246349 | A1* | 11/2006 | Uh ........................... 429/175 |
| 2006/0263647 | A1* | 11/2006 | Moon et al. ................ 429/7 |

FOREIGN PATENT DOCUMENTS

| CN | 101000950 | 7/2007 |
| JP | 08-212992 | 8/1996 |
| JP | 08-227722 | 9/1996 |
| JP | 2007-157452 | 6/2007 |
| JP | 2008-027616 | 2/2008 |
| KR | 10-2006-0028187 | 3/2006 |
| KR | 10-0624957 | 9/2006 |
| KR | 10-2007-0108800 | 11/2007 |

OTHER PUBLICATIONS

Chinese Office Action issued by Chinese Patent Office, dated Dec. 27, 2010, corresponding to Chinese Patent Application No. 200810168253.4, together with English translation.

Chinese Office Action issued by Chinese Patent Office on Apr. 27, 2010 corresponding Chinese Patent Application No. 200810168253.4 together with English translation.

* cited by examiner

*Primary Examiner* — Ula C. Ruddock
*Assistant Examiner* — Alix Echelmeyer
(74) *Attorney, Agent, or Firm* — Robert E. Bushnell, Esq.

(57) ABSTRACT

A secondary battery includes an electrode assembly for generating electricity, a can for accommodating the electrode assembly, and a cap assembly. The can has an open top and the cap assembly seals the open top. The electrode assembly has a plurality of electrode tabs through which electricity is supplied. The cap assembly includes an insulating case that has a plurality of tab drawing grooves. Each of the tab drawing grooves is capable of being occupied by one of the electrode tabs. A number of the tab drawing grooves is greater than a number of the electrode tabs. One of the electrode tabs can be drawn through one of the tab drawing grooves. Other tab drawing grooves are left as spare grooves, and therefore it is not necessary to change the shape of the insulating case even though the structure of the secondary battery is changed.

19 Claims, 3 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on the 2nd of Oct. 2007 and there duly assigned Serial No. 10-2007-0099239.

BACKGROUND OF THE INVENTION

1. Field of the Invention

The present invention relates to a secondary battery having an insulating case. The insulating case has grooves through which electrode tabs protruding from an electrode assembly can be drawn. The insulating case has spare grooves, and therefore, can be used in a variety of designs of the secondary batteries.

2. Description of the Related Art

Rechargeable secondary batteries are economical over disposable dry cells. In recent years, as low-volume and high-capacity secondary batteries are developed, they are widely used as power supplies for portable electronic/electrical devices, such as cellular phones, camcorders, notebook computers and the like.

The secondary batteries include nickel-cadmium batteries, nickel-metal hydride batteries, nickel-zinc batteries, and lithium secondary batteries. Among them, the lithium secondary batteries are most widely used because of their small size, high capacity, high operating voltage, and high energy density per weight.

The lithium secondary batteries may be classified into can-type lithium secondary batteries and pouch-type lithium secondary batteries depending on shapes of a casing, which accommodates an electrode assembly having a negative electrode plate, a positive electrode plate and a separator. The can-type lithium secondary batteries may be further classified into cylinder-type lithium secondary batteries and prismatic-type lithium secondary batteries.

When the lithium secondary battery is of the can type, the casing is generally formed of a metal such as aluminum and has a cylindrical shape, a prismatic shape, or a pillar shape with rounded edges.

The can has an upper opening through which an electrode assembly is inserted and electrolyte is injected into the can. The can is then covered by a cap assembly having a size and shape corresponding to the opening of the can, resulting in a sealed bare cell.

When the lithium secondary battery is of the pouch-type, a pouch casing has a space for accommodating an electrode assembly, which is accommodated on a lower surface of the casing.

The lower surface is covered with an upper surface of the pouch casing, and sealing portions are formed at edges of the upper and lower surfaces of the pouch casing and bonded to be sealed, resulting in a bare cell.

The bare cell configured above is electrically connected with a protecting circuit board, which includes a protecting device for preventing accident caused by abnormal operation, such as overcharge, over-discharge, over-current, and the like.

In general, the electrical connection between the bare cell and the protecting circuit board is made via a lead. Such a secondary battery may be called a core pack.

The core pack is received in an outer case or a gap of the core pack is filled with a hot-melt resin. The core pack is then subjected to a tubing process with a thin casing and a labeling process, resulting in a battery pack.

When the lithium secondary battery is of a prismatic type, an insulating case is positioned on a top of the electrode assembly. The insulating case electrically insulates the electrode assembly from the cap assembly, and fixes the positions of positive and negative electrode tabs protruded from the electrode assembly.

At this time, only one groove for fixing the position of the positive electrode tab is formed at one side of the insulating case. For this reason, when the position of the positive electrode tab is changed due to a different length of an electrode plate, the shape of the insulating case may also be changed. Therefore, efficiency of processes may be degraded as the shape of the insulating case is changed.

SUMMARY OF THE INVENTION

In accordance with an exemplary embodiment, the present invention provides a secondary battery which includes an electrode assembly generating electricity, a can for accommodating the electrode assembly and having an open top, and a cap assembly sealing the open top of the can. The electrode assembly includes a positive electrode plate, a negative electrode plate, a separator disposed between the positive electrode plate and the negative electrode plate, a positive electrode tab connected to the positive electrode plate, and a negative electrode tab connected to the negative electrode plate. The cap assembly includes an insulating case that has tab drawing grooves including a first tab drawing groove through which the positive electrode tab or the negative electrode tab is drawn and a second tab drawing groove through which the positive electrode tab and the negative electrode are not drawn.

In accordance with another exemplary embodiment, the present invention provides a secondary battery which includes an electrode assembly generating electricity and including a plurality of electrode tabs through which the electricity is supplied, a can for accommodating the electrode assembly and having an open top, and a cap assembly sealing the open top of the can. The cap assembly includes an insulating case that has a plurality of tab drawing grooves. Each of the tab drawing grooves is capable of being occupied by one of the electrode tabs. A number of the tab drawing grooves is greater than a number of the electrode tabs.

The insulating case may include a body part that has an upper surface that is substantially parallel to the open top of the can, a first major side surface, and a second major side surface disposed at the opposite of the first major side surface. The tab drawing grooves may be formed on the first major side surface or on the second major side surface.

A number of the tab drawing grooves formed on the first major side surface may be different from a number of the tab drawing grooves formed on the second major side surface.

A number of the tab drawing grooves formed on the first major side surface may be the same as a number of the tab drawing grooves formed on the second major side surface.

As described above, according to the present invention, the insulating case has spare tab drawing grooves. Therefore, it is unnecessary to change the shape of the insulating case even though the positions of an electrode tabs of the electrode assembly are changed, thus maximizing efficiency of processes.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
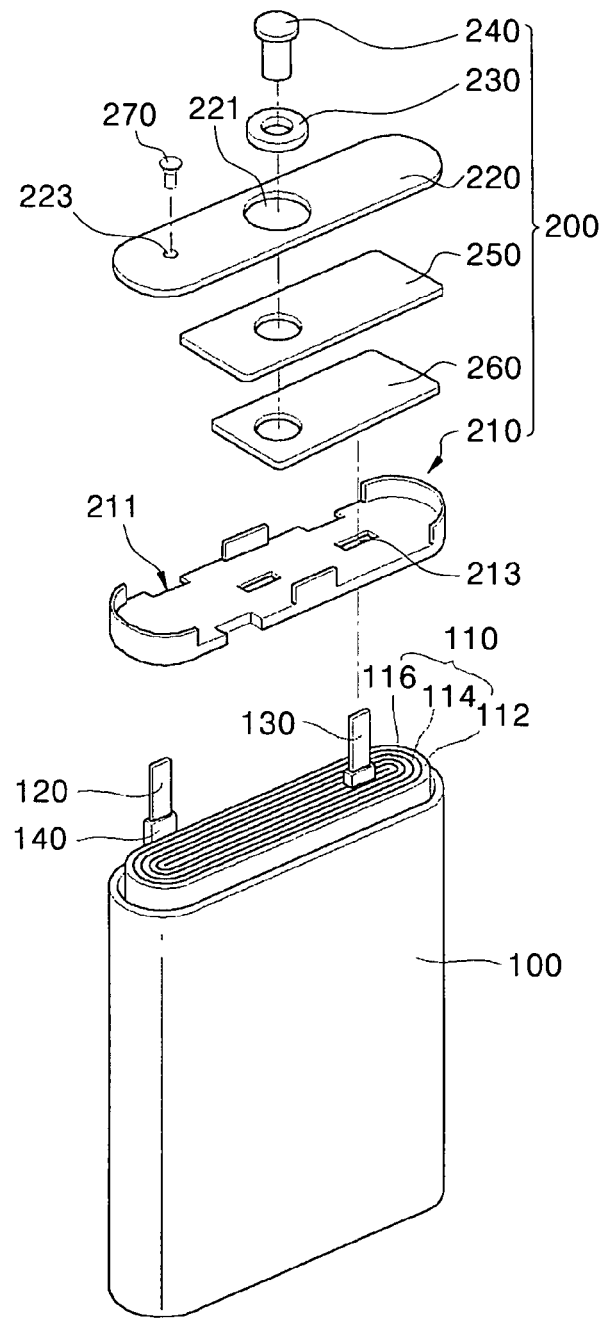
FIG. 1 is an exploded perspective view of a secondary battery according to an embodiment of the present invention.

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. Distances, thicknesses and the like of layers and areas in the drawings may be exaggerated for convenience of illustration.

Figure 2A:
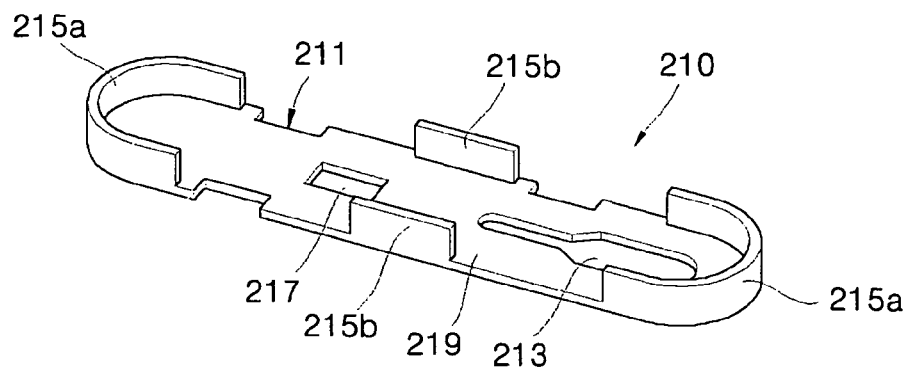
FIGS. 2A through 2C are perspective views of various shapes of insulating cases in a secondary battery according to embodiments of the present invention.
Figure 2B:
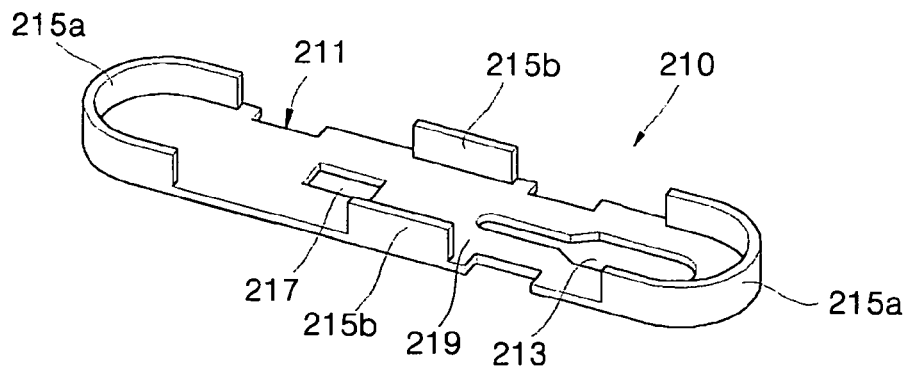
Figure 2C:
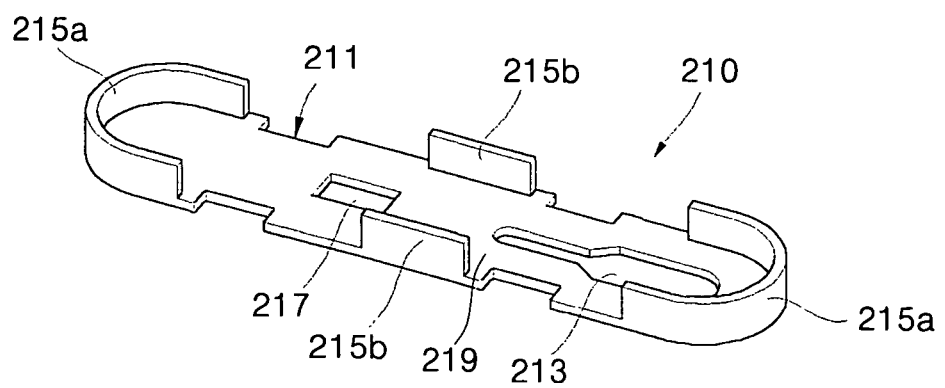

FIG. 1 is an exploded perspective view of a secondary battery constructed as an embodiment of the present invention. FIGS. 2A through 2C are perspective views of various shapes of insulating cases in a secondary battery constructed embodiments of the present invention.

Referring to FIG. 1, the secondary battery includes a can 100 having an opening on the top, an electrode assembly 110 accommodated inside the can 100, and a cap assembly 200 sealing the opening of the can 100.

The can 100 may be formed of a metal material. The can 100 accommodates the electrode assembly 110 and an electrolyte. The can 100 can accommodate an insulating case disposed on the electrode assembly 110. Light and flexible aluminum, aluminum alloy, stainless steel or the like may be used as the metal material. Since the can 100 formed of a metal material has conductivity, it can be used as an electrode terminal.

The can 100 may be formed in a prismatic shape or an elliptical shape with curved corners. The opened top of the can 100 is welded or thermally fused with a cap plate 220, which is included in the cap assembly 200, to seal the can 100.

The electrode assembly 110 includes a positive electrode plate 112, a negative electrode plate 116 and a separator 114. The positive electrode plate 112 includes a positive electrode coating portion that is formed by coating a positive electrode collector with a positive electrode active material. The negative electrode plate 116 includes a negative electrode coating portion that is formed by coating a negative electrode collector with a negative electrode active material. The separator 114 is interposed between the positive electrode plate 112 and the negative electrode plate 116, to prevent a short between the two plates 112 and 116 and to enable movement of electrolytic ions.

The positive electrode plate 112 also includes a positive electrode non-coating portion that is not coated with the positive electrode active material, and the negative electrode plate 116 also includes a negative electrode non-coating portion that is not coated with the negative electrode active material.

A first electrode tab 120 electrically connected to the cap plate 220 is attached to the positive electrode non-coating portion, and a second electrode tab 130 electrically connected to the electrode terminal 240 is attached to the negative electrode non-coating portion. Hereinafter, the first electrode tab 120 represents a positive electrode tab, and the second electrode tab 130 represents a negative electrode tab.

An insulating tape 140 for preventing a short between electrodes can be provided at portions of the positive and negative electrode tabs 120 and 130, which are drawn from the positive and negative electrode plates 112 and 116, respectively.

At this time, the positive and negative electrode tabs 120 and 130 may be attached to the positive and negative electrode non-coating portions, respectively, by ultrasonic welding. In the present invention, the attachment method is not limited particularly.

The positive electrode collector may include stainless steel, nickel, aluminum, titanium, an alloy thereof, aluminum or stainless steel surface-treated with carbon, nickel, titanium or silver, and the like. Preferably, aluminum or aluminum alloy is used for the positive electrode collector.

The positive electrode collector may be formed in shapes of a foil, a film, a sheet, a punched piece, a porous body, a foaming agent, and the like. The thickness of the positive electrode collector is typically 1 µm to 50 µm and preferably 1 µm to 30 µm. The shape and thickness of the positive electrode collector, however, is not limited particularly.

The positive electrode active material is a material for occluding or separating lithium ions. Preferably, the positive electrode active material includes at least one kind selected from cobalt, manganese and nickel, and one or more kinds of mixed oxides with lithium.

The negative electrode collector may include stainless steel, nickel, copper, titanium, an alloy thereof, copper or stainless steel surface-treated with carbon, nickel, titanium or silver, and the like. Preferably, copper or copper alloy is used for the negative electrode collector.

The negative electrode collector may be formed in shapes of a foil, a film, a sheet, a punched piece, a porous body, a foaming agent, and the like. The thickness of the positive electrode collector is typically 1 µm to 50 µm and preferably 1 µm to 30 µm. The shape and thickness of the negative electrode collector, however, is not limited particularly.

The negative electrode active material is a material for occluding or separating lithium ions. The negative electrode active material may include a carbon material such as crystalline carbon, amorphous carbon, carbon complex or carbon fabric, lithium metal, lithium alloy, and the like.

The separator 114 is typically formed of a thermoplastic resin such as polyethylene (PE) or polypropylene (PP). The separator 114 has a surface with a porous film structure.

In the porous structure, whenever the thermoplastic resin approaches a melting point due to increase in temperature inside the battery, the separator 114 is melted to block holes, resulting in an insulating film. Due to the formation of the insulating film, movement of lithium ions between the positive and negative electrodes 112 and 116 is interrupted, and current no longer flows, thus stopping the increase in temperature inside the battery.

The cap assembly 200 includes an insulating case 210, a cap plate 220, an insulating gasket 230, an electrode terminal 240, an insulating plate 250, a terminal plate 260, and a stopper 270 of an electrolyte injection hole.

The insulating case 210 is disposed on the electrode assembly 110 that is inserted into the can 100. The insulating case 210 hampers movement of the electrode assembly 110.

The insulating case 210 has support portions that serve as walls for holding the terminal plate 260 and the insulating plate 250 covering the terminal plate 260.

Further, the insulating case 210 has tab drawing grooves 211 and a tab drawing hole 213 that guide the positive and negative electrode tabs 120 and 130. One of the positive and negative electrode tabs can be drawn through the tab drawing groove while another of the positive and negative electrode tabs can be drawn through the tab drawing hole. Therefore, the positive and negative electrode tabs 120 and 130 are spaced apart from each other at a predetermined distance, and a short between them is prevented. In general, the positive electrode tab 120 can be guided through one of the tab drawing grooves 211, and the negative electrode tab 130 can be provided to a central portion of the electrode assembly 110 through the tab drawing hole 213. Alternatively, the negative electrode tab 130 also can be guided through the tab drawing groove 211, and the positive electrode tab 120 may be provided to a central portion of the electrode assembly 110 through the tab drawing hole 213. It will be apparent that the positions of the positive and negative electrode tabs 120 and 130 are not limited particularly in the present invention.

Detailed description of the insulating case 210 will be described later with reference to FIGS. 2A through 2C.

The insulating case 210 may be formed of insulating polymer resin, such as polypropylene (PP), polyphenylene sulfide (PAPS), polyester sulfone (PES) or modified-polyphenylene oxide (PPO).

The cap plate 220 is a metal plate with substantially the same size and shape as the opening of the can 100. The cap plate 220 is coupled to the opening of the can 100 to seal the opening of the can 100. The cap plate 220 has a terminal through-hole 221 into which the insulating gasket 230 and the electrode terminal 240 are inserted.

The cap plate 220 is provided with an electrolyte injection hole 223 for providing a passage through which an electrolyte is injected inside the can 100. After injecting the electrolyte inside the can 110, the electrolyte injection hole 223 is sealed by the stopper 270 of an electrolyte injection hole, so that the can 100 is closed.

The insulating gasket 230 is coupled to the terminal through-hole 221 formed in the cap plate 220. The insulating gasket 230 is formed of a rubber or non-conductive material with an excellent insulation property. A hole is formed at a central portion of the insulating gasket 230. The electrode terminal 240 is inserted into the hole of the insulating gasket 230, and the electrode terminal-inserted gasket is inserted into the though-hole 221.

The electrode terminal 240 is inserted into the hole formed in the insulating gasket 230 to be coupled to the cap plate 220. A bottom portion of the electrode terminal 240 is electrically connected to the terminal plate 260 while passing through the cap plate 220.

The insulating plate 250 is formed of an insulating material. The insulating plate 250 is formed between the cap plate 220 and the terminal plate 260 to insulate the cap plate 220 from the terminal plate 260.

The insulating plate 250 is provided with a hole corresponding to the terminal through-hole 221 formed in the cap plate 220, and the electrode terminal 240 penetrates through the hole of the insulating plate 250. The electrode terminal 240 is inserted through the hole and connected to the terminal plate 260, so that the electrode terminal 240 is electrically connected to the negative electrode tab 130 welded to the terminal plate 260. The terminal plate 260 is formed beneath the insulating plate 250. The terminal plate 260 is formed of a conductive material to form an electrical path of the electrode terminal 240 and the negative electrode tab 130 welded to the terminal plate 260.

FIGS. 2A through 2C are perspective views of various shapes of insulating cases in a secondary battery constructed as embodiments of the present invention.

Referring to FIGS. 2A through 2C, the insulating case 210 in the secondary battery of this embodiment includes a body part 219. The body part 219 has an upper surface that is substantially parallel to the open top of the can, major side surfaces, and minor side surfaces.

The body part 219 has the size and shape capable of being inserted inside a can. The body part 219 is provided with a plurality of tab drawing grooves 211 formed at major side surfaces. Electrode tabs are drawn through one or more tab drawing grooves 211.

The tab drawing grooves 211 are formed to guide any one of positive and negative electrode tabs protruding out of the electrode assembly 110. The number of tab drawing grooves 211 is greater than that of electrode tabs, so that the body part 219 further includes one or more tab drawing grooves that are not occupied by an electrode tab.

A groove through which an electrode tab is drawn is referred to as a first tab drawing groove, and a groove through which an electrode tab is not drawn is referred to as a second tab drawing groove.

Thus, although the position, at which an electrode tab is drawn, is changed depending on a design of a secondary battery, the electrode tab can be drawn through the second tab drawing groove that is a spare groove.

Accordingly, since it is unnecessary to change the shape of an insulating case every time when the design of the secondary battery changes, even though the position at which an electrode tab is drawn is changed. Therefore, unnecessary processes are reduced, thus maximizing efficiency of processes can be obtained.

At this time, the position of the tab drawing groove 211 is not particularly limited in the present invention. If a plurality of tab drawing grooves 211 are formed at different major side surfaces, for example, a first major side surface and a second major side surface that is an opposite side of the first major side surface, the positions of the tab drawing grooves can be symmetrically formed as shown in FIG. 2C. But in other embodiments, the tab drawing grooves can be formed asymmetrically. In other words, the number of the tab drawing grooves at each of the first major side surface and the second major side surface can be different as shown in FIGS. 2A and 2B, or the tab drawing grooves at each of the first major side surface and the second major side surface be asymmetrically arranged.

The upper surface of the body part 219 includes a tab drawing hole 213 and an electrolyte injection hole 217. An electrode tab that is not guided by an tab drawing groove can be drawn through the tan drawing hole 213. The electrolyte injection hole 217 provides a passage through which an electrolyte is injected into the electrode assembly.

The insulating case 210 includes a minor side support portion 215a that is formed on an edge of the body part 219 that is closer to the minor side surface of the body part 219. The minor side support portion 215a protrudes upwardly in a predetermined height from the edge of the body part 219. The protrusion is substantially perpendicular to the upper surface of the body part 219.

When the insulating case 210 is accommodated in the can 100, the minor side support portion 215a allows the insulating case 210 to closely adhere to an inner wall of the can 100, thus preventing movement of the insulating case 210.

One or a plurality of major side support portions 215b can be formed on another edge of the body part 219 that is closer to the major side surface of the body part 219. The major side support portion 215b protrudes upwardly in a predetermined height from the edge of the body part 219, and the protrusion is substantially perpendicular to the upper surface of the body part 219. Preferably, the major side support portion 215b is formed to have the same height as the minor side support portion 215a.

The major side support portion 215b reinforces the major side surface that could be weaker than the minor side surface of the body part 219. When a physical impact is applied to the battery, the major side support portion 215b prevents deformation of the body part 219.

Preferably, the minor and major side support portions 215a and 215b are integrally formed with the body part 219 through an injection molding.

A secondary battery formed as described above may be an inner pack formed by connecting a bare cell to a protective circuit board disposed at one side of the bare cell and coupled to the cap assembly to form a core pack and then tubing and labeling the core pack with a thin case.

Alternatively, a secondary battery having a bare cell formed as described above, may be a hard pack by connecting a bare cell to a protective circuit board disposed at one side of the bare cell and coupled to the cap assembly to form a core pack and then accommodating the core pack into an additional outer case.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A secondary battery, comprising:
    an electrode assembly generating electricity and comprising a first electrode tab and a second electrode tab;
    a can for accommodating the electrode assembly, the can having an open top; and
    a cap assembly sealing the open top of the can, the cap assembly comprising an insulating case, the insulating case comprising a body part that comprises an upper surface that is substantially parallel to the open top of the can and two opposite major side surfaces, the insulating case comprising a plurality of tab drawing grooves including a first tab drawing groove through which the first electrode tab is drawn and at least one of second tab drawing grooves through which the first electrode tab is not drawn, at least one of the two opposite major side surfaces comprising multiple tab drawing grooves, and a tab drawing hole through which the second electrode tab is drawn,
    wherein the size of each of the tab drawing grooves is related to that of the first electrode tab such that the side surfaces of the first tab drawing grooves surround the side surfaces of the first electrode tab,
    wherein the insulating case includes a support portion formed on the body part, the support portion includes a major side support portion that is formed on an edge of the body part closer to either one of the two opposite major side surfaces than another edge of the body part, and
    wherein the major side support portion is disposed on the at least one of the two opposite major side surfaces comprising multiple tab drawing grooves and between the multiple tab drawing grooves, and a side surface of the major side support portion is flush with a portion of the at least one of the two opposite major side surfaces disposed between the multiple tab drawing grooves.

2. The secondary battery according to claim 1, wherein the can is formed in a prismatic shape or an elliptical shape with curved corners.

3. The secondary battery according to claim 1, wherein a number of the tab drawing grooves formed on the first major side surface is different from a number of the tab drawing grooves formed on the second major side surface.

4. The secondary battery according to claim 1, wherein a number of the tab drawing grooves formed on the first major side surface is the same as a number of the tab drawing grooves formed on the second major side surface.

5. The secondary battery according to claim 1, wherein the support portion protrudes upwardly in a direction substantially perpendicular to the upper surface of the body part.

6. The secondary battery according to claim 5, wherein the support portion is integrally formed with the body part.

7. The secondary battery according to claim 1, further comprising a protective circuit board coupled to the cap assembly.

8. The secondary battery according to claim 1, wherein the secondary battery is an inner pack.

9. The secondary battery according to claim 1, wherein the secondary battery is a hard pack.

10. A secondary battery, comprising:
    an electrode assembly generating electricity and comprising a plurality of electrode tabs through which the electricity is supplied;
    a can for accommodating the electrode assembly, the can having an open top; and
    a cap assembly sealing the open top of the can, the cap assembly comprising an insulating case that comprises a plurality of tab drawing grooves formed immediately neighboring to an edge of the insulating case, each of the tab drawing grooves capable of being occupied by one of the electrode tabs, a total number of the tab drawing grooves being greater than a total number of the electrode tabs,
    wherein the size of each of tab drawing grooves is related to that of the electrode tab occupying one of the tab drawing grooves such that the side surfaces of one of the tab drawing grooves surround the side surfaces of the first electrode tab,
    wherein the insulating case includes a body part that has an upper surface that is substantially parallel to the open top of the can, a first major side surface, and a second major side surface disposed at the opposite of the first major side surface, the tab drawing grooves are formed on the first major side surface or on the second major side surface, the first major side surface comprises multiple tab drawing grooves,
    wherein the insulating case includes a support portion formed on the body part, the support portion includes a major side support portion that is formed on an edge of the body part closer to either the first or second major side surface than another edge of the body part, and
    wherein the major side support portion is disposed on the first major side surface and between the multiple tab drawing grooves, and a side surface of the major side support portion is flush with a portion of the first opposite major side surface disposed between the multiple tab drawing grooves.

11. The secondary battery according to claim 10, wherein the can is formed in a prismatic shape or an elliptical shape with curved corners.

12. The secondary battery according to claim 10, wherein a number of the tab drawing grooves formed on the first major side surface being different from a number of the tab drawing grooves formed on the second major side surface.

13. The secondary battery according to claim 10, wherein a number of the tab drawing grooves formed on the first major side surface being the same as a number of the tab drawing grooves formed on the second major side surface.

14. The secondary battery according to claim 10, wherein the upper surface of the body part has a tab drawing hole through which positive and negative electrode tabs are drawn.

15. The secondary battery according to claim 10, wherein the support portion protrudes upwardly in a direction substantially perpendicular to the upper surface of the body part.

16. The secondary battery according to claim 15, wherein the support portion is integrally formed with the body part.

17. The secondary battery according to claim 10, further comprising a protective circuit board coupled to the cap assembly.

18. The secondary battery according to claim 10, wherein the secondary battery is an inner pack.

19. The secondary battery according to claim 10, wherein the secondary battery is a hard pack.

* * * * *